JOHN BAIRD MURRAY
INVENTOR

HIS ATTORNEY

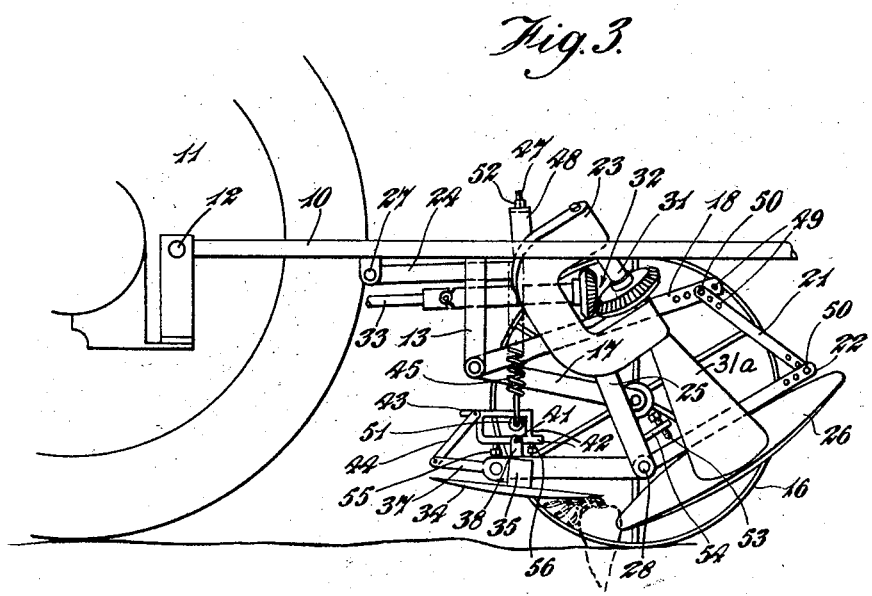
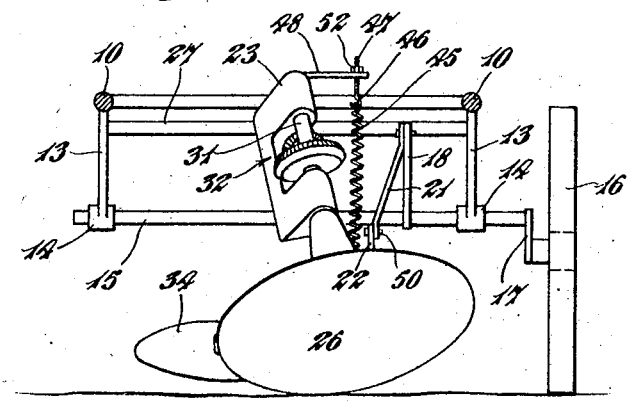

Patented Feb. 13, 1951

2,541,777

UNITED STATES PATENT OFFICE 2,541,777

TOPPING DEVICE FOR SUGAR BEET AND LIKE ROOT CROPS

John Baird Murray, Smallford, near St. Albans, England

Application June 6, 1947, Serial No. 752,929
In Great Britain March 8, 1946

Section 1, Public Law 690, August 8, 1946
Patent expires March 8, 1966

6 Claims. (Cl. 56—121.46)

This invention relates to devices for topping sugar beet and like root crops prior to the removal of the roots from the ground.

According to the invention, the topping device comprises a cutter supported by a floating linkage for movement in a vertical sense, and a pilot member mounted ahead of said cutter to pass over the roots, the pilot member being so connected with said linkage as to adjust the vertical position of the cutter in accordance with the height of the crown of the root.

The cutter may be carried by a cutter supporting member pivotally mounted about a horizontal axis forward of the cutter, and supported against downward movement about said pivot by a beam carrying the pilot member at its forward end, and suspended at its rear end from an auxiliary frame supported by a landwheel.

The invention is hereinafter described with reference to the accompanying drawings, in which:

Figure 3 is a side elevation similar to Figure 1, but showing the position of the parts when the cutter is just commencing to remove the top of a root, the height of the root being somewhat exaggerated to show the change of position of the parts more clearly; and Figure 4 is a rear elevation of the device.

Figure 1:
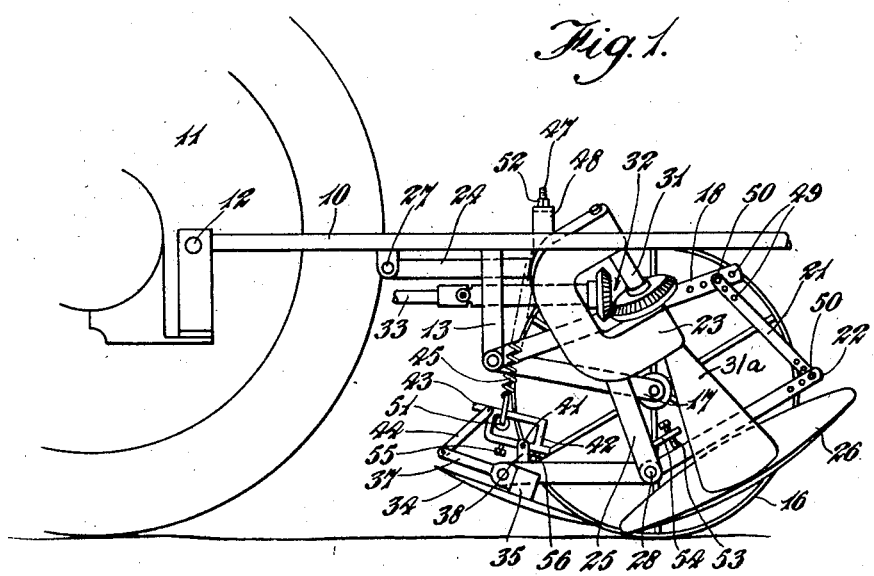
Figure 1 is a side elevation of a topping device according to the invention, the parts being in their normal position and the device being coupled to the rear of a tractor.
Figure 2:
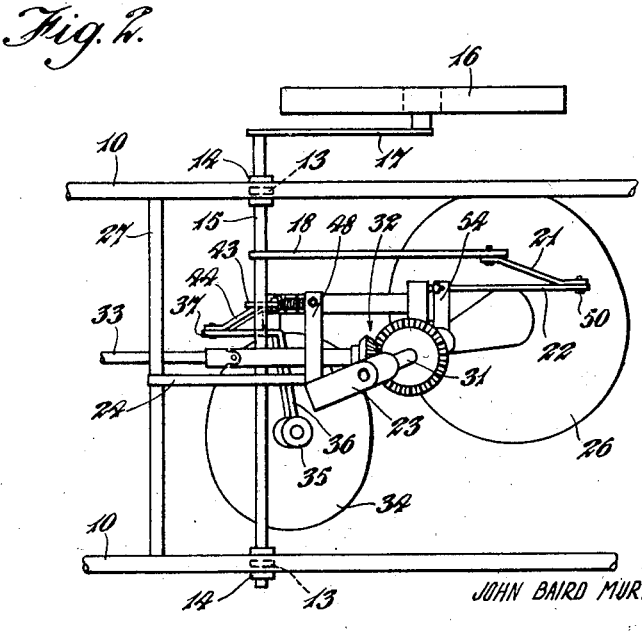
Figure 2 is a plan view of the topping device shown in Figure 1.

Referring to the drawings, a main frame 10, which may be the forward portion of the frame of a harvesting machine having one or more land wheels at its rear end, is adapted to be attached to the rear of a tractor 11 by a horizontal pivot shaft 12, and is formed with two downwardly extending arms 13, 13 carrying bearings 14, 14 for a transverse shaft 15 forming a first transverse horizontal pivot and carrying an arm 17 extending backwardly from one end of the shaft 15, and a second arm 18 spaced laterally from the arm 17 also extends backwardly from the shaft 15, both arms 17 and 18 being rigidly secured to the shaft. The arms 17 and 18, together with the shaft 15, form an auxiliary frame supported by a landwheel 16 mounted on the arm 17. A dependent link 21, pivotally coupled to the rear end of the arm 18 is pivotally connected at its lower end to the rear end of a beam member bent to form an obtuse angle. A U-shaped bracket 23 with its arms extending rearwardly and somewhat upwardly, a forwardly projecting bar 24 rigidly fixed to the bracket 23, and a downwardly projecting post 25 also rigidly fixed to the bracket 23 form together a cutter supporting member supporting a cutting disc 26. The forward end of the bar 24 is pivotally connected to the frame at 27 by a second transverse horizontal pivot shaft, and the lower end of the post 25 is pivotally connected at 28 to an intermediate point on the beam 22 by a third transverse horizontal pivot shaft, so that the cutter supporting member is capable of movement in a vertical plane about the pivot 27. The cutter disc 26 is mounted on a cutter shaft 31 journalled in the arms of the bracket 23, the shaft 31 including between the bracket 23 and the cutter disc 26 a frusto-conical portion 31a which increases in diameter toward the cutter disc, the plane of the bracket being somewhat inclined to the vertical in a transverse direction, so that the cutter shaft is inclined to the vertical both rearwardly in the line of travel of the device, and transversely of the said line of travel, and the lowest point of the edge of the cutter disc 26 is forward and to one side of its centre. The cutter disc 26 is driven through bevel gearing 32 from a universally jointed shaft 33 coupled to a drive take-off on the tractor 11.

A pilot member 34, comprising a disc having a convexly curved under-surface, is freely rotatable in a bearing 35 carried by an arm 36 projecting laterally from the forward end of the beam member 22, the arm 36 being capable of pivotal movement about a transverse horizontal pivot on the beam member, and being rigid with a forwardly projecting arm 37. A pair of lugs 38 projecting upwardly from the beam member 22 near its forward end provide bearings for a spindle 41 on which is mounted a U-shaped member 42 having rigidly fixed to the ends of its arms a bar 43 lying parallel to the base of the U, and projecting forwardly beyond the latter. A link 44, pivotally attached to both the arm 37 and the bar 43, connects the said arm and bar together. A tension spring 45, the upper end of which is coupled to a hook 46 on the lower end of a threaded rod 47 supported in a pillar 48 forming part of the cutter supporting frame, engages at its lower end with a roller 51 engaging the underside of the bar 43 between the arms of the U-shaped member 42. The tension of the spring is adjustable by means of a nut 52 on the threaded rod 47.

The U-shaped member 42 is capable of rocking movement about the spindle 41, such movement being limited by stops 55 and 56 engaging the upper surface of the beam member 22. In all positions of the roller 51 relative to the bar 43, the axis of the spindle 41 is behind the line of action of the spring 45, so that the said spring urges the pilot member towards the position shown in Figure 1.

The relative positions of the cutter disc 26 and the pilot member 34 in a vertical direction, are adjustable by varying the positions of the pivotal connections between the link 21 and the arm 18 and beam member 22. Each of these three members is provided with a plurality of holes 49 to receive removable pivot pins 50.

The weight of the cutter disc 26 and the cutter supporting member, and of the pilot member 34, acts downwardly, and is only partially supported by the spring 45. Downward movement of the cutter disc 26 and pilot member 34 is limited by an adjustable stop member 53 in the form of a screw passing through a lug 54 projecting backwardly from the post 25, and engaging with the upper side of the beam member 22.

The topping device operates in the following manner. The stop member 53 is adjusted so that, when the device is coupled to the back of the tractor, the cutter disc 26 and pilot member 34 are just clear of the ground as shown in Figure 1. The device is towed along a row of roots to be harvested with the lowest point of the edge of the cutter disc substantially in line with the said row. The pilot member 34 rides over each root in turn, and, due to its centre being offset laterally is rotated. The passage of the pilot member over the root lifts the beam member 22, and therefore lifts the cutter disc, so that the latter cuts the root at a height determined by the relative positions of the pilot member and cutter disc. The spacing of the pilot member and cutter disc in the direction of travel is such that the pilot member is just leaving a root as the cutter disc reaches it. The forward edge of the pilot member 34 is normally held in an upwardly tilted position by the spring 45 and, with the pilot member in this position, the bar 43 is inclined upwardly and forwardly, so that the roller 51 is held by the spring 45 at the forward end of the bar, and the spring 45 exerts its maximum lifting effect in the beam member 22. As the pilot member passes over a root, however, and the rear part of the said member only is supported by the root, the weight of the mechanism, acting through the centre of the pilot member, tends to tilt the front of the latter downwardly, thus reducing the inclination of the bar 43, and causing the spring 45 to move the roller 51 towards the rear of the bar as shown in Figure 3. The angle between the line of action of the spring 45 and a line extending from the attachment point of the spring at 48 to the pivot between the post 25 and the beam member 22 is thus reduced, reducing the effectiveness of the spring and giving a greater resultant downward load on the cutter which tends to stabilise it during the actual topping of the root. As soon as the pilot member has moved clear of the root, it is returned to its normal position by the spring 45, and the roller 51 again moves to the forward end of the bar.

The U-shaped member 42 may be so arranged that the line of action of the spring 45 passes behind the spindle 41 when the pilot member is tilted downwardly at its front edge, an additional spring then being provided, conveniently between the front end of the bar 43 and the bracket 48, to return the pilot member to its normal position.

The cutter disc rotates in the opposite direction to the pilot disc.

The topping device may be mounted on a main frame supported by its own wheels, instead of being directly mounted at the rear of a tractor.

What I claim is:

1. A topping mechanism comprising a main frame, an auxiliary frame joined to said main frame by a first transverse horizontal pivot shaft and including land-wheel means, a cutter supporting member joined to said main frame by a second transverse horizontal pivot shaft, a cutter carried by said cutter supporting member, a beam member connected to said cutter supporting member by a third transverse horizontal pivot shaft, a link connecting the rear end of said auxiliary frame and the rear end of said beam member and connected to both said frame and said beam member by pivot pins, a pilot member, a pivotal mounting for said pilot member at the forward end of said beam member, and spring means acting on said pilot member to urge it to a forwardly and upwardly inclined position.

2. A topping mechanism comprising a main frame, an auxiliary frame joined to said main frame by a first transverse horizontal pivot shaft and including land-wheel means, a cutter-supporting member joined to said main frame by a second transverse horizontal pivot shaft, a cutter carried by said cutter-supporting member, a beam member connected to said cutter-supporting member by a third transverse horizontal pivot shaft, a link connecting the rear end of said auxiliary frame and the rear end of the beam member and connected to both said frame and said beam member by pivot pins, a pilot member, a pivotal mounting for said pilot member at the forward end of said beam member, a bar, a pivotal mounting for said bar on the beam, linkage means connecting the bar and pilot member for simultaneous rocking movement, a spring, an attachment for one end of the spring on the cutter-supporting member, and a follower carried by the other end of the spring and engaging the bar, the spring acting through the bar to rock the pilot member forwardly and upwardly and the change of the angle between the line of action of the spring and the bar when the pilot member is rocked to a substantially horizontal position being such that the follower is displaced under the spring load from one end of the bar to the other.

3. A topping mechanism comprising a main frame, an auxiliary frame joined to said main frame by a first transverse horizontal pivot shaft and including land-wheel means, a cutter-supporting member joined to said main frame by a second transverse horizontal pivot shaft, a cutter shaft journalled in said cutter-supporting member and having its axis inclined both rearwardly and transversely of the main frame, a disc cutter mounted on said cutter shaft, means for rotating said cutter shaft, a beam member connected to said cutter-supporting member by a third transverse horizontal pivot shaft, a link connecting the rear end of said auxiliary frame and the rear end of said beam member and connected to both said frame and said beam member by pivot pins, a pilot member, a pivotal mounting for said pilot member at the forward end of said beam member, and spring means acting on said pilot member to urge it to a forwardly and upwardly inclined position, the centre of said pilot member being disposed in fore-and-aft alignment with the lowest point of the edge of the disc cutter.

4. A topping mechanism comprising a main frame, an auxiliary frame joined to said main frame by a first transverse horizontal pivot shaft and including land-wheel means, a cutter-supporting member joined to said main frame by a second transverse horizontal pivot shaft, a cutter shaft journalled in said cutter-supporting member and having its axis inclined both rearwardly and transversely of the main frame, a disc cutter mounted on said cutter shaft, means for rotating said cutter shaft, a beam member connected to said cutter-supporting member by a third transverse horizontal pivot shaft, a link connecting the rear end of said auxiliary frame and the rear end of said beam member and connected to both said frame and said beam member by pivot pins, a disc-shaped pilot member, a pivotal mounting for said pilot member at the forward end of the beam member, the axis of said pivotal mounting being parallel to the plane of the pilot member, and spring means acting on said pilot member to urge it to a forwardly and upwardly inclined position, the centre of said pilot member being disposed in fore-and-aft alignment with the lowest point of the edge of the disc cutter.

5. A topping mechanism comprising a main frame, an auxiliary frame joined to said main frame by a first transverse horizontal pivot shaft and including land-wheel means, a cutter-supporting member joined to said main frame by a second transverse horizontal pivot shaft, a cutter carried by said cutter-supporting member, a beam member connected to said cutter-supporting member by a third transverse horizontal pivot shaft, pivotal suspension means at the rear end of the said beam member to support it from the auxiliary frame, a pilot member, a pivotal mounting for said pilot member at the forward end of the beam member, said pilot member being adapted for rocking movement about said pivotal mounting upon engagement with a root to be topped, a spring acting to support partially the weight of the cutter-supporting member and cutter, and means operated by the rocking movement of the pilot member to vary the proportion of the weight of the cutter-supporting member and cutter supported thereby.

6. A topping mechanism comprising a main frame, an auxiliary frame joined to said main frame by a first transverse horizontal pivot shaft, said auxiliary frame including two arms extending rearwardly from said pivot, a land-wheel carried by one of said arms, a cutter supporting member joined to said main frame by a second transverse horizontal pivot shaft forward of and above the first transverse horizontal pivot shaft, a cutter carried by said cutter-supporting member, a beam member connected intermediate its ends to said cutter-supporting member by a third transverse horizontal pivot shaft disposed below and behind the first and second transverse horizontal pivot shafts, pivotal suspension means at the rear end of said beam member to support it from the other arm of said auxiliary frame, a pilot member, a pivotal mounting for said pilot member at the forward end of said beam member, said pilot member being adapted for rocking movement about said pivotal mounting upon engagement with a root to be topped, a bar, a pivotal mounting for said bar on the forward end of the beam, linkage means connecting the pilot member and bar for simultaneous rocking movement, a spring, an attachment for one end of the spring on the cutter supporting member, and a follower carried by the other end of the spring and engaging the bar, whereby the spring exerts a pull tending both to rock the pilot member forwardly and upwardly and to decrease the angle between the forward part of the beam and the cutter-supporting member so as to raise the beam and cutter, rocking movement of the pilot member to a substantially horizontal position causing the bar to take up an angular position such that the spring urges the follower towards the rear end of the bar to reduce its effective action on the beam.

JOHN BAIRD MURRAY.

REFERENCES CITED

The following references are of record in the file of this patent:

UNITED STATES PATENTS

| Number | Name | Date |
| --- | --- | --- |
| 757,425 | Reed et al. | Apr. 12, 1904 |
| 820,391 | Conner | May 15, 1906 |
| 919,392 | Gettelmann | Apr. 27, 1909 |
| 1,462,486 | Devey | July 24, 1923 |
| 1,598,527 | Jensen | Aug. 31, 1926 |
| 1,821,573 | Peer | Sept. 1, 1931 |
| 2,337,698 | Walz | Dec. 28, 1943 |
| 2,340,919 | Allen | Feb. 8, 1944 |
| 2,458,795 | Orendorff | Jan. 11, 1949 |

FOREIGN PATENTS

| Number | Country | Date |
| --- | --- | --- |
| 609,254 | Great Britain | Sept. 28, 1948 |